United States Patent
Kim et al.

(10) Patent No.: US 12,443,517 B2
(45) Date of Patent: Oct. 14, 2025

(54) NON-VOLATILE MEMORY DEVICE PERFORMING RESET OPERATION, STORAGE DEVICE INCLUDING THE SAME, METHOD OF OPERATING THE SAME

(71) Applicant: Samsung Electronics Co., Ltd., Suwon-si (KR)

(72) Inventors: Dae-Won Kim, Suwon-si (KR); Seong Geon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/779,352

(22) Filed: Jul. 22, 2024

(65) Prior Publication Data
US 2025/0252038 A1 Aug. 7, 2025

(51) Int. Cl.
*G06F 3/06* (2006.01)
*G06F 12/02* (2006.01)

(52) U.S. Cl.
CPC ........ *G06F 12/0223* (2013.01); *G06F 3/0617* (2013.01); *G06F 3/0632* (2013.01); *G06F 3/0653* (2013.01); *G06F 3/0679* (2013.01)

(58) Field of Classification Search
CPC .... G06F 12/0223; G06F 3/061; G06F 3/0611; G06F 3/0613; G06F 3/0617; G06F 3/0632; G06F 3/0634; G06F 3/0629; G06F 3/0653; G06F 3/0679; G06F 3/0688
See application file for complete search history.

(56) References Cited

U.S. PATENT DOCUMENTS

| | | | |
|---|---|---|---|
| 6,073,182 A | 6/2000 | Jones et al. | |
| 8,838,840 B1 | 9/2014 | Fair et al. | |
| 10,157,159 B2 | 12/2018 | Ikeda et al. | |
| 10,606,490 B2 | 3/2020 | Nimura et al. | |
| 10,725,848 B2 | 7/2020 | Kurts et al. | |
| 12,287,975 B2* | 4/2025 | Lin | G06F 3/0625 |
| 2009/0138783 A1* | 5/2009 | Aoki | G11B 20/1803 |
| | | | 714/764 |
| 2015/0120990 A1* | 4/2015 | Chu | G06F 3/0679 |
| | | | 711/103 |
| 2015/0205662 A1* | 7/2015 | Ishikuri | G06F 11/0793 |
| | | | 714/6.11 |
| 2016/0202914 A1* | 7/2016 | Hsu | G06F 3/0683 |
| | | | 711/158 |
| 2023/0098366 A1 | 3/2023 | Zhu et al. | |

FOREIGN PATENT DOCUMENTS

JP 2021105964 A 7/2021

* cited by examiner

*Primary Examiner* — Michael Krofcheck
(74) *Attorney, Agent, or Firm* — Wolf, Greenfield & Sacks, P.C.

(57) ABSTRACT

A method of operating a non-volatile memory device includes receiving a first command signal for a state check operation from the storage controller, determining whether the non-volatile memory device is in a busy state based on the first command signal, determining whether a busy time interval during which the busy state is continuously maintained exceeds a threshold time interval in response to determining that the non-volatile memory device is in the busy state, performing a reset operation of the non-volatile memory device in response to determining that the busy time interval exceeds the threshold time interval, and providing a fail response signal to the storage controller in response to determining that the busy time interval exceeds the threshold time interval.

20 Claims, 11 Drawing Sheets

FIG. 8

| <Response for a state check operation> | | |
|---|---|---|
| State / Return Value | Ready State | Busy State |
| Pass Response | Available (Memory operation success) | Unavailable |
| Fail Response | Available (Memory operation fail) | Available (Busy hang escape) |

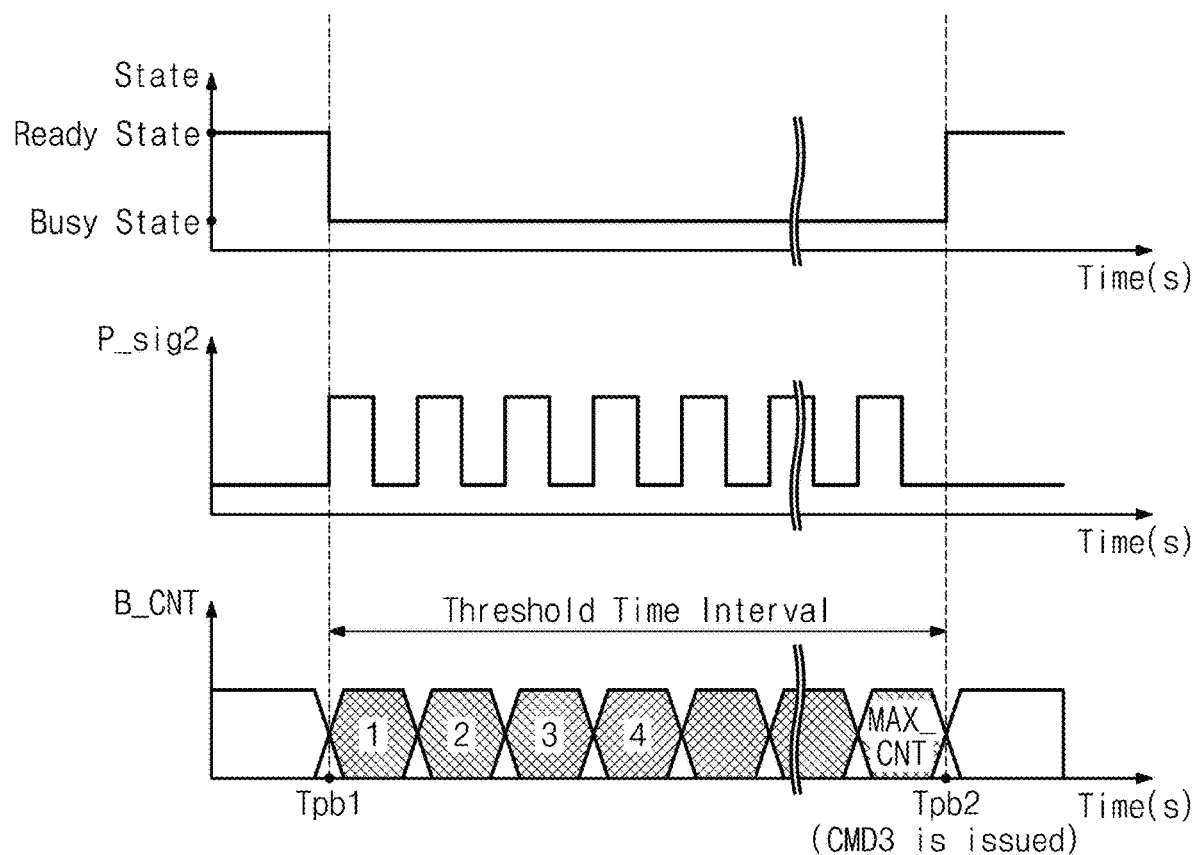

NON-VOLATILE MEMORY DEVICE PERFORMING RESET OPERATION, STORAGE DEVICE INCLUDING THE SAME, METHOD OF OPERATING THE SAME

CROSS-REFERENCE TO RELATED APPLICATIONS

This application claims priority under 35 U.S.C. § 119 to Korean Patent Application No. 10-2024-0018187 filed on Feb. 6, 2024, in the Korean Intellectual Property Office, the disclosures of which are incorporated by reference herein in their entireties.

FIELD

Embodiments of the present disclosure described herein relate to a memory device, and more particularly, relate to a non-volatile memory device and a method of operating the same.

BACKGROUND

A memory device stores data in response to a write request and outputs data stored therein in response to a read request. For example, memory devices may be classified as a volatile memory device, which loses data stored therein when a power is turned off, such as a dynamic random access memory (DRAM) device or a static RAM (SRAM) device, or a non-volatile memory device, which retains data stored therein even when a power is turned off, such as a flash memory device, a phase-change RAM (PRAM), a magnetic RAM (MRAM), or a resistive RAM (RRAM).

The non-volatile memory device may be used in a storage device for storing data. The non-volatile memory device may operate in a ready state or a busy state. The ready state may refer to a state in which a memory operation such as a read operation, a write operation, or an erase operation is available. The busy state may refer to a state in which a currently requested memory operation is unavailable due to the execution of another memory operation, a limited resource, or any other factor. During the busy state, it may be impossible to perform memory operations. This may makes it difficult to determine a defect of the storage device in a device test step and/or may make normal operation of the storage device more difficult in a product usage step.

SUMMARY

Embodiments of the present disclosure provide a non-volatile memory device configured to perform a reset operation, a storage device including the same, and a method of operating the same.

According to an embodiment, a non-volatile memory device is configured to communicate with a storage controller. A method of operating the non-volatile memory device includes receiving a first command signal for a state check operation from the storage controller, determining whether the non-volatile memory device is in a busy state, based on the first command signal, determining whether a busy time interval during which the busy state is continuously maintained exceeds a threshold time interval, in response to determining that the non-volatile memory device is in the busy state, performing a reset operation of the non-volatile memory device, in response to determining that the busy time interval exceeds the threshold time interval, and providing a fail response signal to the storage controller, in response to determining that the busy time interval exceeds the threshold time interval.

According to an embodiment, a non-volatile memory device includes a control logic circuit that is configured to receive a first command signal for a memory operation and a second command signal for a state check operation from a storage controller, and a memory cell array. The control logic circuit is configured to determine whether the non-volatile memory device is in a busy state, based on the second command signal, determine whether a busy time interval during which the busy state is continuously maintained exceeds a threshold time interval, in response to determining that the non-volatile memory device is in the busy state, perform a reset operation of the non-volatile memory device, in response to determining that the busy time interval exceeds the threshold time interval, and provide a fail response signal to the storage controller, in response to determining that the busy time interval exceeds the threshold time interval.

According to an embodiment, a storage device includes a storage controller that is configured to generate a first command signal for a state check operation, and a non-volatile memory device. The non-volatile memory device is configured to receive the first command signal, determine whether the non-volatile memory device is in a busy state, based on the first command signal, determine whether a busy time interval during which the busy state is continuously maintained exceeds a threshold time interval, in response to determining that the non-volatile memory device is in the busy state, perform a reset operation of the non-volatile memory device, in response to determining that the busy time interval exceeds the threshold time interval, and provide a fail response signal to the storage controller, in response to determining that the busy time interval exceeds the threshold time interval.

BRIEF DESCRIPTION OF THE DRAWINGS

The above and other objects and features of the present disclosure will become apparent by describing in detail embodiments thereof with reference to the accompanying drawings.

FIG. 8 is a diagram describing responses of a status check operation according to some embodiments of the present disclosure.

FIG. 12 is a graph describing a state of a non-volatile memory device of FIG. 11, according to some embodiments of the present disclosure.

DETAILED DESCRIPTION OF EMBODIMENTS

Below, embodiments of the present disclosure will be described in detail and clearly to such an extent that one skilled in the art can carry out embodiments of the present disclosure. The terms "first," "second," etc., may be used herein merely to distinguish one component, layer, direction, etc. from another. The terms "comprises," "comprising," "includes" and/or "including," when used herein, specify the presence of stated elements, but do not preclude the presence of additional elements. The term "and/or" includes any and all combinations of one or more of the associated listed items. The term "connected" may be used herein to refer to a physical and/or electrical connection.

Figure 1:
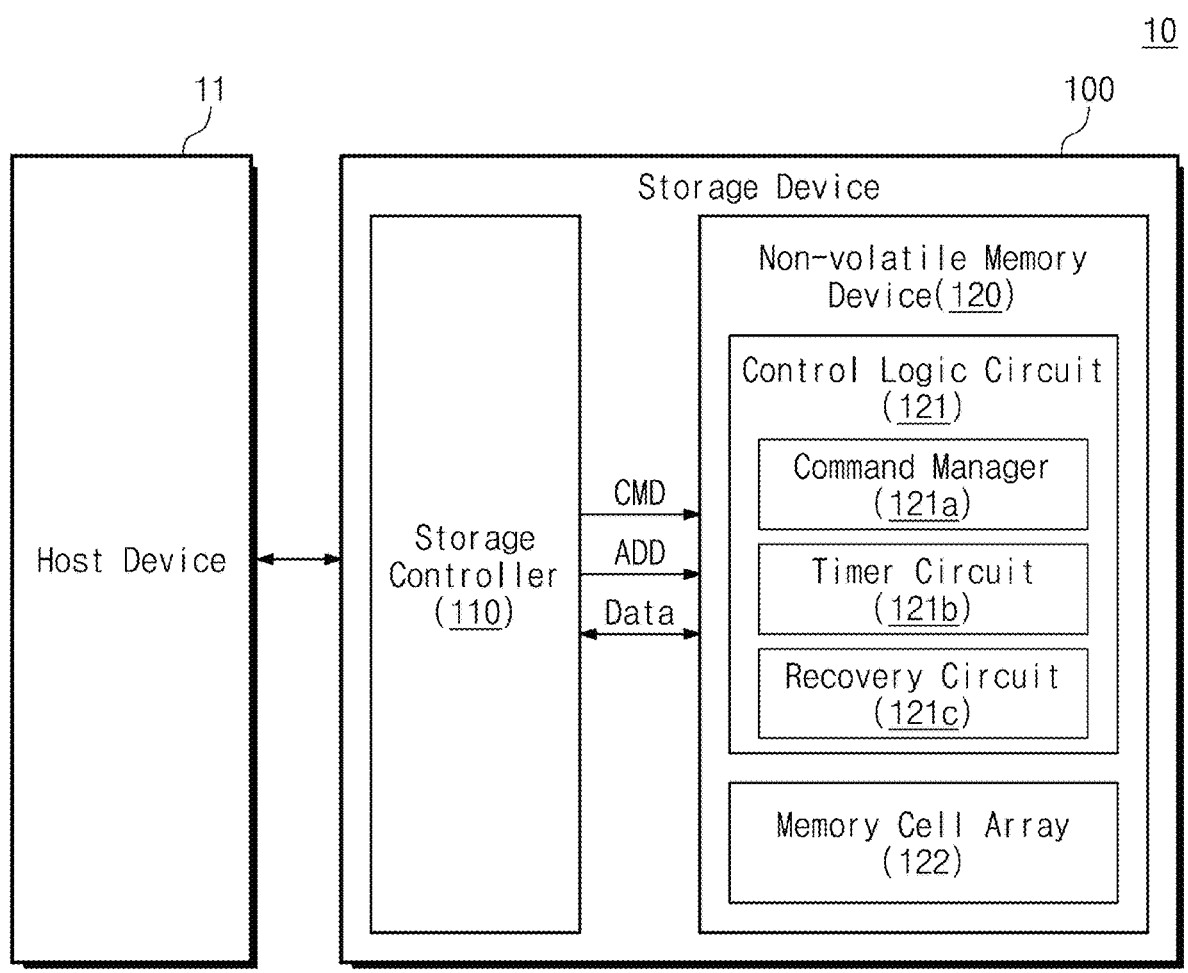
FIG. 1 is a block diagram of an electronic device according to an embodiment of the present disclosure.

FIG. 1 is a block diagram of an electronic device according to an embodiment of the present disclosure. In Referring to FIG. 1, an electronic device 10 may include a computing system configured to process a variety of information or to store the processed information as data. In some embodiments, the electronic device 10 may be implemented with a personal computer (PC), a notebook, a laptop, a server, a workstation, a tablet PC, a smartphone, a digital camera, a black box, etc. The electronic device 10 may include a host device 11 and a storage device 100.

The host device 11 may control an overall operation of the electronic device 10. In detail, the host device 11 may write or store data in the storage device 100, may read data stored in the storage device 100, or may erase or delete data stored in the storage device 100. Also, the host device 11 may manage hardware information (e.g., a voltage, a temperature, and a read count) of the storage device 100 to maintain the reliability of the stored data and may provide voltages necessary to drive the storage device 100.

For example, the host device 11 may include a host processor and a host memory. The host processor may be implemented with a processing device such as a central processing unit (CPU), a graphic processing unit (GPU), or a neural processing unit (NPU).

The storage device 100 may include a storage controller 110 and a non-volatile memory device 120. Under control of the host device 11 or depending on an algorithm of internal firmware, the storage controller 110 may perform a device management operation or a memory operation in the non-volatile memory device 120. The memory operation may refer to an operation associated with processing of data, such as a write operation, a read operation, or a delete operation (also referred to herein as an erase operation). The device management operation may refer to an operation for managing the non-volatile memory device 120, such as an initialization operation, a reset operation, or a state check operation.

The storage controller 110 may provide signals including a command CMD and an address ADD to the non-volatile memory device 120. The command CMD may indicate an operation to be performed in the non-volatile memory device 120. The address ADD may indicate a location where an operation corresponding to the command CMD is to be performed. The storage controller 110 may exchange data (or may perform the data communication) with the non-volatile memory device 120. The data may include write data to be written through the write operation, read data to be read through the read operation, a response indicating a processing result of the command CMD, etc.

The non-volatile memory device 120 may store data under control of the storage controller 110. The non-volatile memory device 120 may retain data present therein even though a power is turned off. For example, the non-volatile memory device 120 may be implemented with a NAND flash memory device, a NOR flash memory device, a phase-change RAM (PRAM), a magnetic RAM (MRAM), a resistive RAM (RRAM), etc.

The non-volatile memory device 120 may include one or more one memory chips. The non-volatile memory device 120 and circuits thereof may be referred to as "on-chip" circuits or components, and an operation which the non-volatile memory device 120 internally performs without the intervention of the storage controller 110 may be referred to as an "on-chip operation". Each of the one or more memory chips of the non-volatile memory device 120 may include a control logic circuit 121 and a memory cell array 122.

The control logic circuit 121 may receive the command CMD and the address ADD from the storage controller 110. The control logic circuit 121 may control an overall operation of the non-volatile memory device 120 based on the command CMD and the address ADD. For example, the control logic circuit 121 may perform the memory operation, such as a write operation, a read operation, and a delete operation, in the memory cell array 122.

The control logic circuit 121 may include a command manager 121a, a timer circuit 121b, and a recovery circuit 121c. Each of the command manager 121a, the timer circuit 121b, and the recovery circuit 121c may be implemented as an internal integrated circuit of the control logic circuit 121 or may be implemented as a separate chip or circuit communicating with the control logic circuit 121.

The command manager 121a may receive the command CMD from the storage controller 110 and may perform the memory operation or the device management operation based on the command CMD. In some embodiments, the command manager 121a may determine whether the non-volatile memory device 120 in the busy state or the ready state, by performing the state check operation.

The busy state may refer to a state where the memory operation of the non-volatile memory device 120 is unavailable. For example, the non-volatile memory device 120 may have the busy state when the non-volatile memory device 120 is already performing another memory operation, when there is a defect factor (for example, device fault) making the execution of the memory operation impossible, or when the execution of the memory operation is impossible due to a limited resource (e.g., a voltage, a temperature, a bandwidth, or a storage space).

The ready state may refer to a state where the memory operation of the non-volatile memory device 120 is available. When it is determined that the non-volatile memory device 120 is in the ready state, the command manager 121a may subsequently perform the memory operation.

The timer circuit 121b may communicate with the command manager 121a. When it is determined that the non-volatile memory device 120 is in the busy state, the command manager 121a may notify the timer circuit 121b that the non-volatile memory device 120 is in the busy state. When it is determined by the command manager 121a that the non-volatile memory device 120 is in the busy state, the timer circuit 121b may determine whether a busy time interval exceeds a threshold time interval. The busy time interval may refer to a time interval during which the busy state is continuously maintained. A phenomenon where the busy state is maintained for a long time or extended duration may be referred to as "busy hang." When it is determined that the busy time interval exceeds the threshold time interval, the timer circuit 121b may generate a trigger signal. The threshold time interval may provide a criterion for determining whether the busy state is maintained for a relatively long time (e.g., in comparison to a reference time interval for performing a memory operation).

The recovery circuit 121c may receive the trigger signal from the timer circuit 121b. The recovery circuit 121c may perform the reset operation based on the trigger signal. For example, the recovery circuit 121c may generate a command for the reset operation and may provide the generated command to the command manager 121a. Alternatively, the recovery circuit 121c may internally perform the reset operation. After the reset operation is completed, the busy state of the non-volatile memory device 120 may be resolved. That is, after the reset operation is completed, the non-volatile memory device 120 may operate in the ready state.

The reset operation may refer to an operation of forcibly initializing the non-volatile memory device 120. When it is determined by the timer circuit 121b that the non-volatile memory device 120 is in the busy state for a relatively long time, the recovery circuit 121c may perform the reset operation for resolving the busy state of the non-volatile memory device 120, in response to the trigger signal received from the timer circuit 121b. The reset operation may also be referred to as a "NAND reset operation," a "forced reset operation," a "recovery operation," or an "initialization operation."

The memory cell array 122 may include a plurality of memory blocks. Each of the plurality of memory blocks may include a plurality of memory cells. Each of the plurality of memory cells may include a transistor. The control logic circuit 121 may adjust a threshold voltage level of a transistor to correspond to one of an erase state and at least one programming state, by adjusting the amount of charges trapped in a floating gate of the transistor. The adjusted threshold voltage level may correspond to data stored in each cell.

Figure 2:
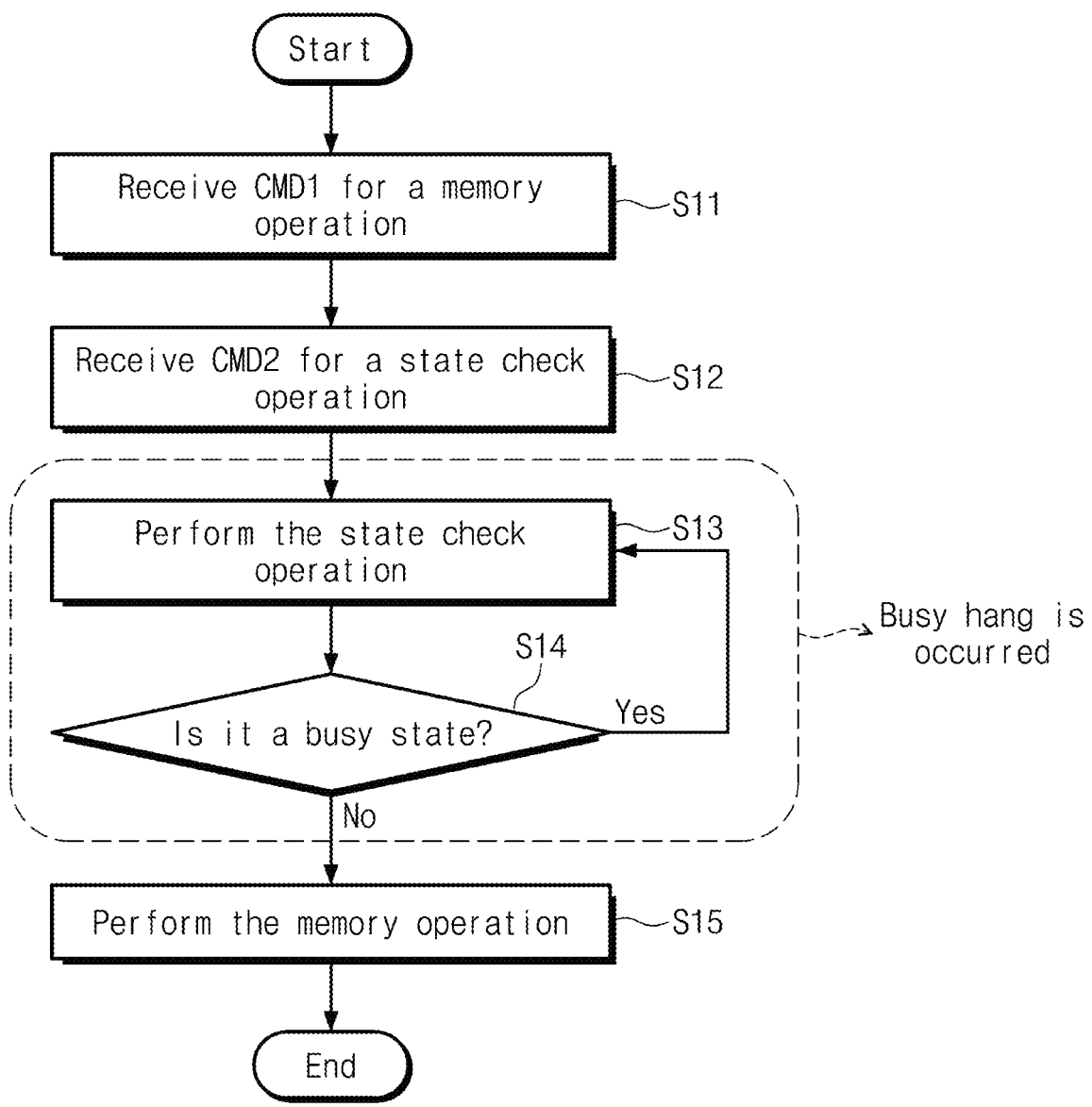
FIG. 2 is a flowchart describing a method of operating an example conventional non-volatile memory device.

FIG. 2 is a flowchart describing a method of operating an example conventional non-volatile memory device. In the flowcharts described herein, operations may be illustrated in a particular sequence, but in some embodiments may be performed in a different sequence or in parallel. An example conventional non-volatile memory device will be described with reference to FIG. 2. Although an example conventional non-volatile memory device is described for better understanding of the present disclosure, the example conventional non-volatile memory device may include technical features not disclosed in documents of the information disclosure statement (IDS) and is not intended to limit the scope of the present disclosure.

The example conventional non-volatile memory device may communicate with a storage controller. The example conventional non-volatile memory device and the storage controller may be collectively referred to as a "storage device."

In operation S11, the example conventional non-volatile memory device may receive a first command CMD1 for the memory operation from the storage controller. The memory operation may refer to an operation of writing, reading, or deleting/erasing data.

In operation S12, the example conventional non-volatile memory device may receive a second command CMD2 for the state check operation from the storage controller. The state check operation may refer to an operation for checking a state of the memory operation performed. The state check operation may include determining whether the example conventional non-volatile memory device operates in the busy state or operates in the ready state.

In operation S13, the example conventional non-volatile memory device may perform the state check operation based on the second command CMD2. The example conventional non-volatile memory device may determine whether the example conventional non-volatile memory device is in the busy state or in the ready state, by performing the state check operation.

In operation S14, the example conventional non-volatile memory device may determine a subsequent operation depending on whether a state determined by the state check operation is the busy state. When it is determined that the state determined by the state check operation is the busy state, the example conventional non-volatile memory device may again perform operation S13.

When operation S13 is again performed, the example conventional non-volatile memory device may again perform the state check operation after a reference time interval corresponding to an operation cycle period passes. When a previous memory operation (i.e., a memory operation different from the memory operation in operation S11) is completed while the reference time interval passes, the example conventional non-volatile memory device may determine a state of the example conventional non-volatile memory device as the ready state through the state check operation again performed.

In contrast, when the busy state is caused by a defect factor such as device fault, the busy state may not be resolved even though operation S13 is repeated. A situation that a loop of operation S13 and operation S14 is continuously repeated may be referred to as a "busy hang".

Returning to operation S14, when it is determined through the state check operation that the example conventional non-volatile memory device is not in the busy state (i.e., when it is determined that the example conventional non-volatile memory device is in the ready state), the example conventional non-volatile memory device may perform operation S15.

In operation S15, the example conventional non-volatile memory device may perform the memory operation based on the first command CMD1. For example, the example conventional non-volatile memory device may store data received from the storage controller, may provide data stored therein to the storage controller, or may delete the stored data.

As described above, some example conventional non-volatile memory devices may have difficulty in detecting the busy hang and/or escaping the busy hang. When the busy hang is caused, it may not be possible to perform the memory operation requested from the storage controller. This may make it difficult to analyze a defect of the storage device in a device test step or make normal operation of the storage device difficult in a product usage step.

Figure 3:
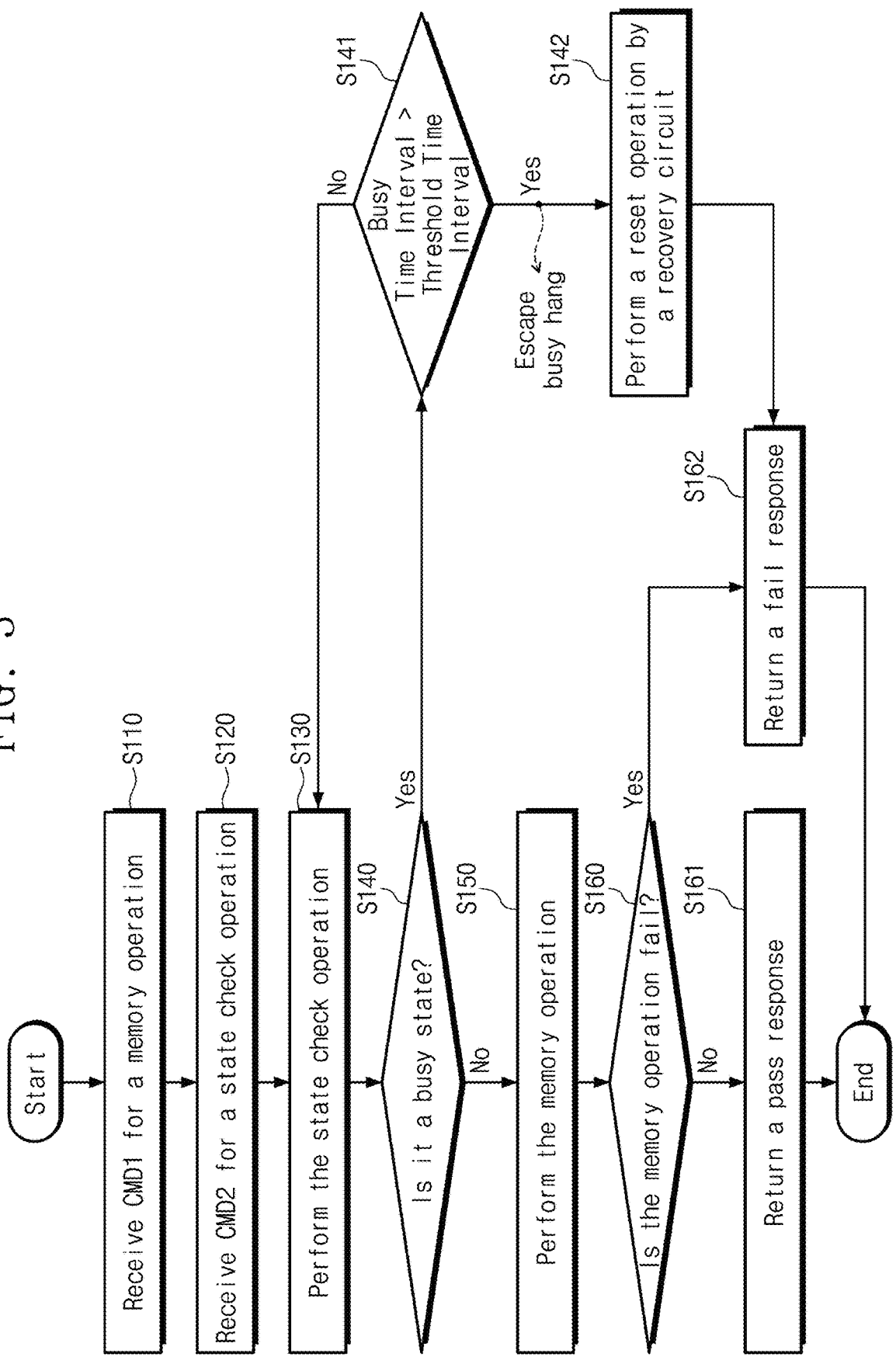
FIG. 3 is a flowchart describing a method of operating a non-volatile memory device according to some embodiments of the present disclosure.

FIG. 3 is a flowchart describing a method of operating a non-volatile memory device according to some embodiments of the present disclosure. Referring to FIG. 3, a non-volatile memory device may correspond to the non-volatile memory device 120 of FIG. 1. The non-volatile memory device may communicate with a storage controller. Operation S110 and operation S120 may be similar to operation S11 and operation S12 of FIG. 2, and thus, additional description will be omitted to avoid redundancy.

In operation S130, the non-volatile memory device may perform the state check operation based on the second command CMD2. The state check operation may refer to an operation for checking a state of the memory operation performed. The state check operation may include determining whether the non-volatile memory device operates in the busy state or operates in the ready state. The busy state may indicate that performance of the memory operation associated with the first command CMD1 is unavailable, and the ready state may indicate that performance of the memory operation associated with the first command CMD1 is available.

In operation S140, the non-volatile memory device may determine a subsequent operation depending on whether a state determined by the state check operation is the busy state. When it is determined that the state determined by the state check operation is the busy state, the non-volatile memory device may perform operation S141.

In operation S141, the non-volatile memory device may determine whether a busy time interval exceeds a threshold time interval. The busy time interval may refer to a time interval during which the busy state determined by the state check operation in operation S130 is continuously maintained. The threshold time interval may provide a reference time interval or other criterion for determining the busy hang.

When the busy time interval exceeds the threshold time interval, the probability that the busy hang of the non-volatile memory device has occurred may be high. When the busy time interval is less than or equal to the threshold time interval, the busy state of the non-volatile memory device may be temporary, or may be an initial part of (e.g., the first half of) the busy hang.

When it is determined that the busy time interval does not exceed the threshold time interval, the non-volatile memory device may again perform operation S130. When operation S130 is again performed, the non-volatile memory device may again perform the state check operation after a time interval corresponding to an operation cycle period passes. When the busy state is caused by a temporary factor, a previous memory operation (i.e., a memory operation different from the memory operation in operation S110) may be completed while the reference time interval passes, and the non-volatile memory device may determine a state of the non-volatile memory device as the ready state.

In contrast, when the busy state is caused by a defect factor such as device fault, a loop of operation S130, operation S140, and operation S141 may be repeated. The busy time interval in operation S141 of a current loop may be longer than the busy time interval performed in operation S141 of a previous loop. In operation S141, the non-volatile memory device may escape the busy hang before the busy state is maintained for a long time or indefinitely.

In other words, when it is determined in operation S141 that the busy time interval exceeds the threshold time interval, the non-volatile memory device may perform operation S142. Instead of infinitely repeating operation S130 and operation S140, the non-volatile memory device may compare the busy time interval accumulated in operation S141 with the threshold time interval and may escape the busy hang before the busy state is maintained for a long time.

In operation S142, the non-volatile memory device may perform the reset operation through a recovery circuit. The recovery circuit may be a sub-component of the non-volatile memory device. That is, the non-volatile memory device may perform the reset operation as an on-chip operation. Because the reset operation is an on-chip operation, the burden on management of the storage controller associated with the escape from the busy hang or the complexity of a firmware design associated with the escape from the busy hang may not be caused. After the reset operation is performed, the busy state may be resolved. After operation S142 is performed, the non-volatile memory device may perform operation S162.

In operation S162, the non-volatile memory device may return a fail response to the storage controller. The fail response may indicate that the processing of the memory operation associated with the first command CMD1 has failed. Before the busy hang is maintained for an excessively long time interval, the non-volatile memory device may internally escape the busy hang and may return the fail response, and thus, a consistent response time to the state check operation may be guaranteed. The returned response may be used by the storage controller to determine whether to issue a subsequent command.

In some embodiments, when the busy time interval exceeds the threshold time interval, the non-volatile memory device may perform operation S142 and operation S162 in parallel (e.g., partially simultaneously), may perform operation S142 prior to operation S162, or may perform operation S162 prior to operation S142.

Returning to operation S140, when it is determined through the state check operation that the non-volatile memory device is not in the busy state (i.e., when it is determined that the non-volatile memory device is in the ready state), the non-volatile memory device may perform operation S150.

In operation S150, the non-volatile memory device may perform the memory operation based on the first command CMD1. For example, the non-volatile memory device may store data received from the storage controller, may provide data stored therein to the storage controller, or may delete the stored data.

In operation S160, the non-volatile memory device may determine whether the performed memory operation has failed. When the memory operation does not fail (i.e., when the memory operation is successfully performed), the non-volatile memory device may perform operation S161.

In operation S161, the non-volatile memory device may return a pass response to the storage controller. The pass response may indicate that the processing of the memory operation associated with the first command CMD1 has succeeded.

Returning to operation S160, the non-volatile memory device may determine that the memory operation performed in operation S150 has failed. For example, the non-volatile memory device may fail in performing the memory operation due to various factors such as device deterioration (e.g., deterioration for at least some of a read count, an error count, or a program/erase (P/E) cycle count), a limited resource, and an input of another command with higher priority. When the memory operation fails, the non-volatile memory device may perform operation S162. In operation S162, the non-volatile memory device may return the fail response to the storage controller.

As described above, according to embodiments of the present disclosure, the non-volatile memory device may escape the busy hang by detecting the busy hang through an on-chip operation without the intervention of the storage controller, and performing the reset operation by using the recovery circuit. Accordingly, the non-volatile memory device may guarantee a consistent response time without causing burden on management of the storage controller or complexity of the firmware design.

Figure 4:
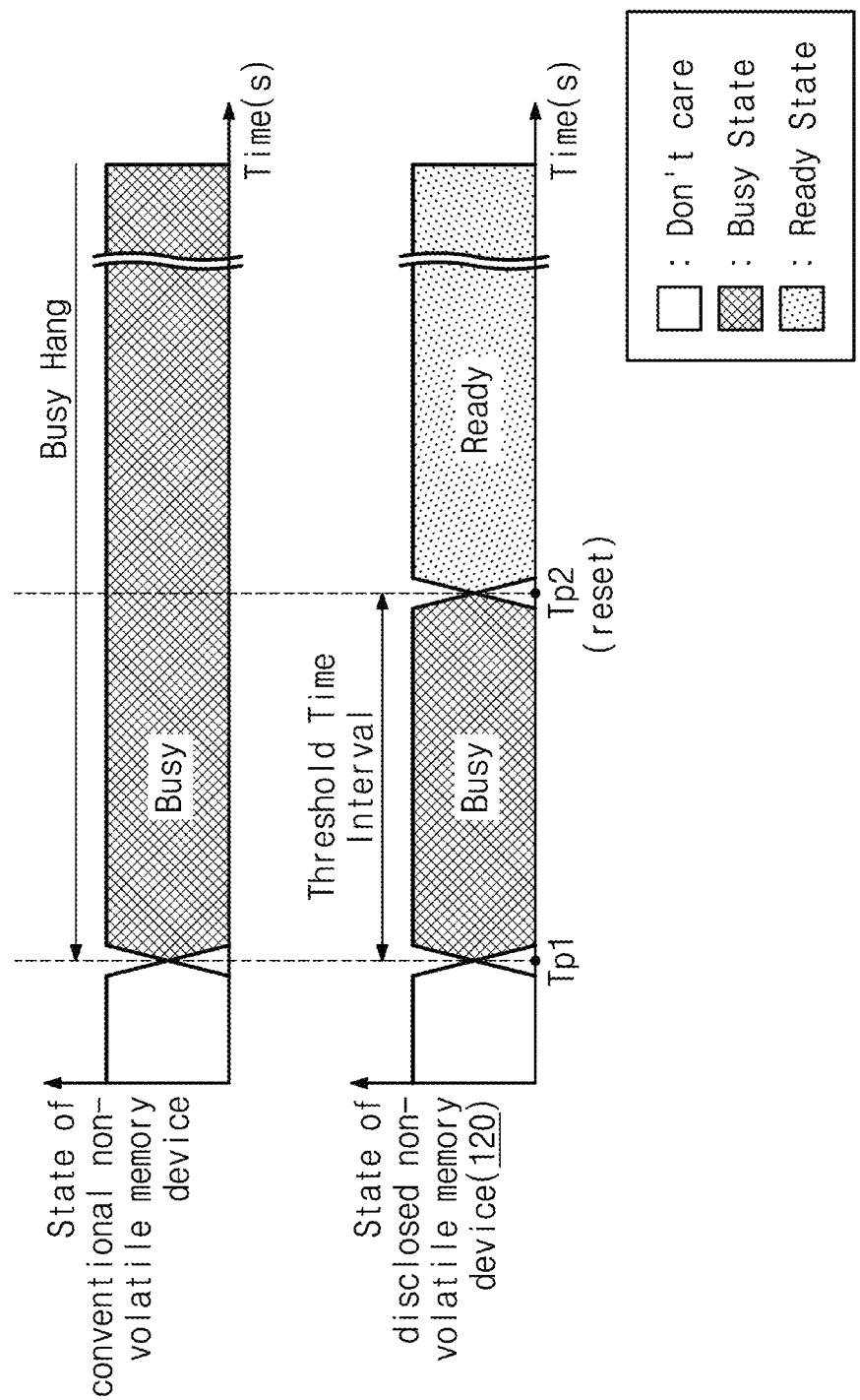
FIG. 4 is a graph describing a busy state of a non-volatile memory device of FIGS. 2 and 3, according to some embodiments of the present disclosure.

FIG. 4 is a graph describing a busy state of a non-volatile memory device of FIGS. 2 and 3, according to some embodiments of the present disclosure. A timing diagram indicating a state of a example conventional non-volatile memory device and a timing diagram indicating a state of the non-volatile memory device 120 of the present disclosure will be described with reference to FIG. 4.

Referring to the timing diagram indicating the state of the example conventional non-volatile memory device, the horizontal axis represents time. The example conventional non-volatile memory device may correspond to the example conventional non-volatile memory device of FIG. 2. In the timing diagram, a shaded portion may indicate a state. A time interval where importance is low is referred to as "don't care region," and the "don't care" region is not shaded. A region corresponding to the busy state is darkly shaded, and a region corresponding to the ready state is lightly shaded.

At a first point in time Tp1, the example conventional non-volatile memory device may initiate the state check operation. The example conventional non-volatile memory device may determine the state of the non-volatile memory device as the busy state through the state check operation. The busy state may be caused by a defect factor. After the reference time interval corresponding to the operation cycle period passes, the example conventional non-volatile memory device may again perform the state check operation. Even though the state check operation is repeated, the busy state may be continuously maintained.

Next, referring to the timing diagram indicating the state of the non-volatile memory device 120 of the present disclosure, the horizontal axis represents time. The non-volatile memory device 120 may correspond to the non-volatile memory device 120 of FIG. 1 and the non-volatile memory device 120 of FIG. 3. Likewise, a time interval where importance is low is referred to as a "don't care region." A region corresponding to the busy state is darkly shaded, and a region corresponding to the ready state is lightly shaded.

At the first point in time Tp1, the non-volatile memory device 120 may initiate the state check operation. The non-volatile memory device 120 may determine the state of the non-volatile memory device 120 as the busy state through the state check operation. The busy state may be caused by a defect factor. The non-volatile memory device 120 may repeat the state check operation until the busy time interval exceeds the threshold time interval. The threshold time interval may correspond to a time interval from Tp1 to Tp2.

At the second point in time Tp2, the busy time interval may reach the threshold time interval. Based on the iteration of the state check operation, the non-volatile memory device 120 may determine that the busy time interval where the busy state of the non-volatile memory device 120 is continuously maintained exceeds the threshold time interval. The non-volatile memory device 120 may perform the reset operation of the non-volatile memory device 120, in response to determining that the busy time interval exceeds the threshold time interval. The non-volatile memory device 120 may perform the reset operation and may then operate in the ready state. As the non-volatile memory device 120 returns the fail response to the storage controller, the non-volatile memory device 120 may notify the storage controller that the non-volatile memory device 120 has escaped the busy hang.

In contrast, because the example conventional non-volatile memory device fails to detect the busy hang or fails to escape the busy hang, the example conventional non-volatile memory device may operate in the busy state even after the second point in time Tp2.

As described above, according to embodiments of the present disclosure, when the busy time interval during which the busy state is continuously maintained reaches the threshold time interval, the non-volatile memory device 120 may forcibly perform the reset operation, and thus, the non-volatile memory device 120 may prevent the phenomenon (i.e., the busy hang) that the busy state is maintained to be excessively long.

Also, because the storage controller issues a subsequent command based on a response returned within a guaranteed or predetermined time, a defect may be quickly and easily analyzed in a device test step, and a storage device may stably operate in a product usage step.

Figure 5:
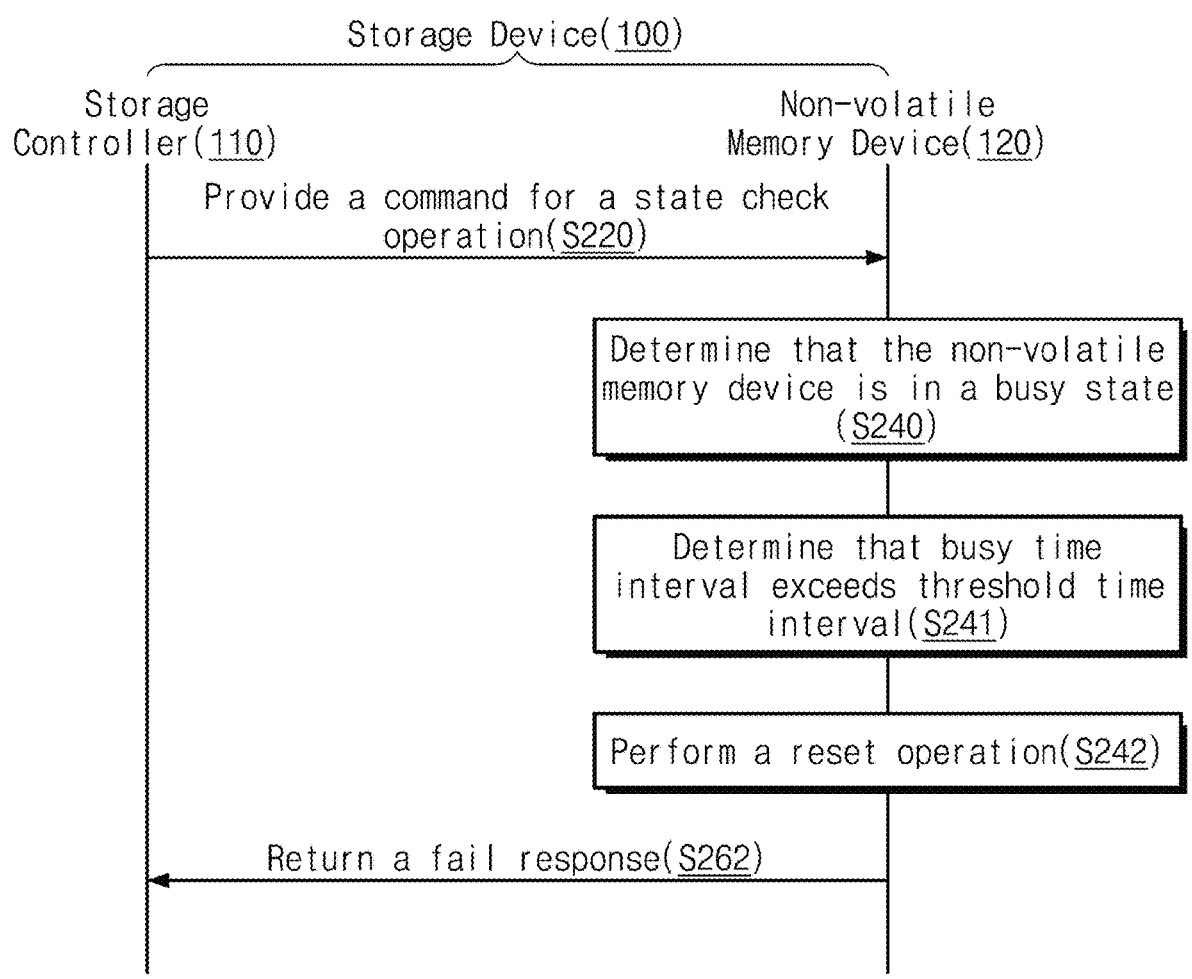
FIG. 5 is a flowchart describing a method of operating a storage device according to some embodiments of the present disclosure.

FIG. 5 is a flowchart describing a method of operating a storage device according to some embodiments of the present disclosure. Referring to FIG. 5, the storage device 100 may include the storage controller 110 and the non-volatile memory device 120. The storage device 100 may correspond to the storage device 100 of FIG. 1.

In operation S220, the storage controller 110 may provide a command for the state check operation to the non-volatile memory device 120. The non-volatile memory device 120 may operate in the busy state or the ready state. The state check operation may include determining whether a state of the non-volatile memory device 120 is in the busy state or in the ready state.

In operation S240, the non-volatile memory device 120 may determine whether the non-volatile memory device 120 is in the busy state or the ready state, by performing the state check operation based on the command. In some embodiments, the non-volatile memory device 120 may determine that the non-volatile memory device 120 is in the busy state.

In operation S241, the non-volatile memory device 120 may determine whether a busy time interval exceeds a threshold time interval. The busy time interval may indicate a time interval during which the busy state determined in operation S240 is continuously maintained. In some embodiments, the non-volatile memory device 120 may determine whether the busy time interval exceeds the threshold time interval. That is, the non-volatile memory device 120 may detect the busy hang.

In operation S242, the non-volatile memory device 120 may perform the reset operation in response to determining that the busy time interval exceeds the threshold time interval. The reset operation may refer to an operation of initializing the non-volatile memory device 120. After the reset operation is performed, the non-volatile memory device 120 may operate in the ready state.

In operation S262, the non-volatile memory device 120 may return the fail response to the storage controller 110 in response to determining that the busy time interval exceeds the threshold time interval.

Figure 6:
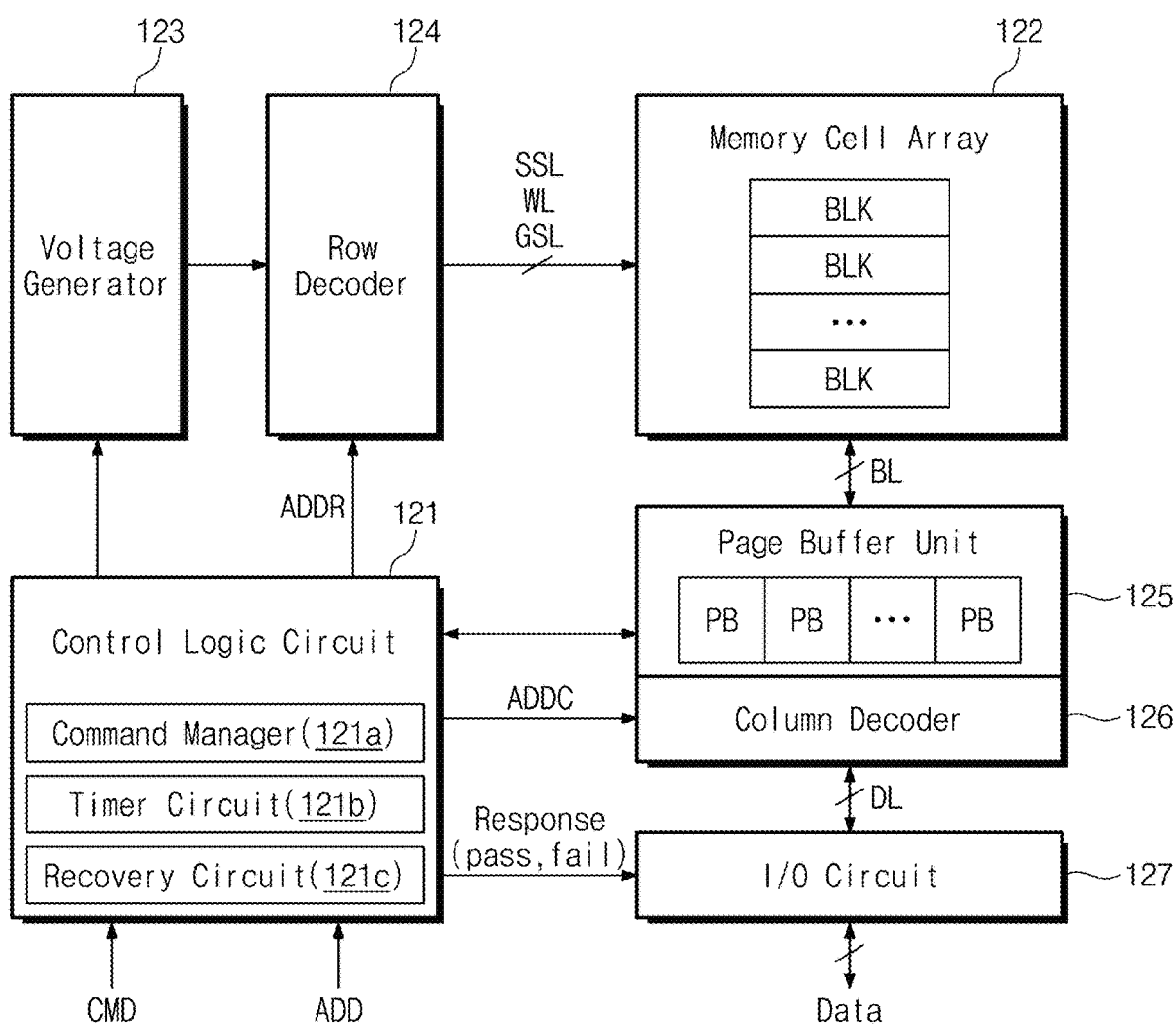
FIG. 6 is a block diagram describing an example of a non-volatile memory device according to some embodiments of the present disclosure.

FIG. 6 is a block diagram describing an example of a non-volatile memory device according to some embodiments of the present disclosure. Referring to FIG. 6, the non-volatile memory device 120 may correspond to the non-volatile memory device 120 of FIG. 1. The non-volatile memory device 120 may receive the command CMD and the address ADD from the storage controller 110. The non-volatile memory device 120 may perform data communication with the storage controller 110.

The non-volatile memory device 120 may include a control logic circuit 121, a memory cell array 122, a voltage generator 123, a row decoder 124, a page buffer unit 125, a column decoder 126, and an input/output (I/O) circuit 127.

The control logic circuit 121 may receive the command CMD and the address ADD. The command CMD may indicate an operation to be performed in the non-volatile memory device 120, such as a memory operation or a device management operation. The address ADD may indicate a location where the operation corresponding to the command CMD is to be performed. The address ADD may include a row address ADDR and a column address ADDC. The control logic circuit 121 may control all the operations of the non-volatile memory device 120 based on the command CMD and the address ADD.

The control logic circuit 121 may include the command manager 121*a*, the timer circuit 121*b*, and the recovery circuit 121*c*. The command manager 121*a* may perform the operation corresponding to the command CMD by controlling any other components of the non-volatile memory device 120 based on the command CMD. For example, the command manager 121*a* may perform the memory operation or the state check operation based on the command CMD.

In some embodiments, the command manager 121*a* may process the command CMD for the state check operation and may generate the pass response or the fail response. The command manager 121*a* may provide the pass response or the fail response to the I/O circuit 127. The I/O circuit 127 may provide the pass response or the fail response to the storage controller 110 of FIG. 1 in the form of data.

The timer circuit 121*b* may communicate with the command manager 121*a*. The command manager 121*a* may determine that the non-volatile memory device 120 is in the busy state, by performing the state check operation and may notify the timer circuit 121*b* that the non-volatile memory device 120 is in the busy state. The timer circuit 121*b* may determine whether a busy time interval during which the busy state is continuously maintained exceeds a threshold time interval. When it is determined that the busy time interval exceeds the threshold time interval, the timer circuit 121*b* may generate a trigger signal.

The recovery circuit 121*c* may receive the trigger signal from the timer circuit 121*b*. The recovery circuit 121*c* may generate a command for the reset operation based on the trigger signal. The recovery circuit 121*c* may provide the command for the reset operation to the command manager 121*a*. The command manager 121*a* may perform the reset operation based on the command received from the recovery circuit 121*c* and may provide the fail response to the I/O circuit 127. The I/O circuit 127 may provide the fail response to the storage controller 110 of FIG. 1 in the form of data.

The memory cell array 122 may include the plurality of memory blocks BLK. Each of the plurality of memory blocks BLK may include a plurality of memory cells. Each of the plurality of memory cells may store data.

Under control of the control logic circuit 121, the voltage generator 123 may control voltages to be applied to the memory cell array 122 through the row decoder 124. For example, the voltage generator 123 may generate voltages corresponding to the write operation, the read operation, or the delete operation, under control of the control logic circuit 121.

The row decoder 124 may receive the row address ADDR from the control logic circuit 121. The row decoder 124 may be connected to the memory cell array 122 through string selection lines SSL, word lines WL, and ground selection lines GSL. The row decoder 124 may decode the row address ADDR and may control voltages to be applied to the string selection lines SSL, the word lines WL, and the ground selection lines GSL based on a decoding result and voltages received from the voltage generator 123.

The page buffer unit 125 may include a plurality of page buffers PB. The page buffer unit 125 may be connected to the memory cell array 122 through bit lines BL. The page buffer unit 125 may read data from the memory cell array 122 by sensing voltages of the bit lines BL under control of the control logic circuit 121.

The column decoder 126 may receive the column address ADDC from the control logic circuit 121. The column decoder 126 may decode the column address ADDC and may provide the data read by the page buffer unit 125 to the I/O circuit 127 based on a decoding result. The I/O circuit 127 may provide data received through data lines DL to the storage controller 110.

The I/O circuit 127 may transfer data received from the storage controller 110 to the column decoder 126 through the data lines DL. The column decoder 126 may receive the column address ADDC from the control logic circuit 121. The column decoder 126 may decode the column address ADDC and may provide the data received from the I/O circuit 127 to the page buffer unit 125 based on a decoding result. The control logic circuit 121 may store data in the memory cell array 122 by controlling the voltage generator 123 and the row decoder 124 by referring to data loaded to the page buffer unit 125.

Figure 7:
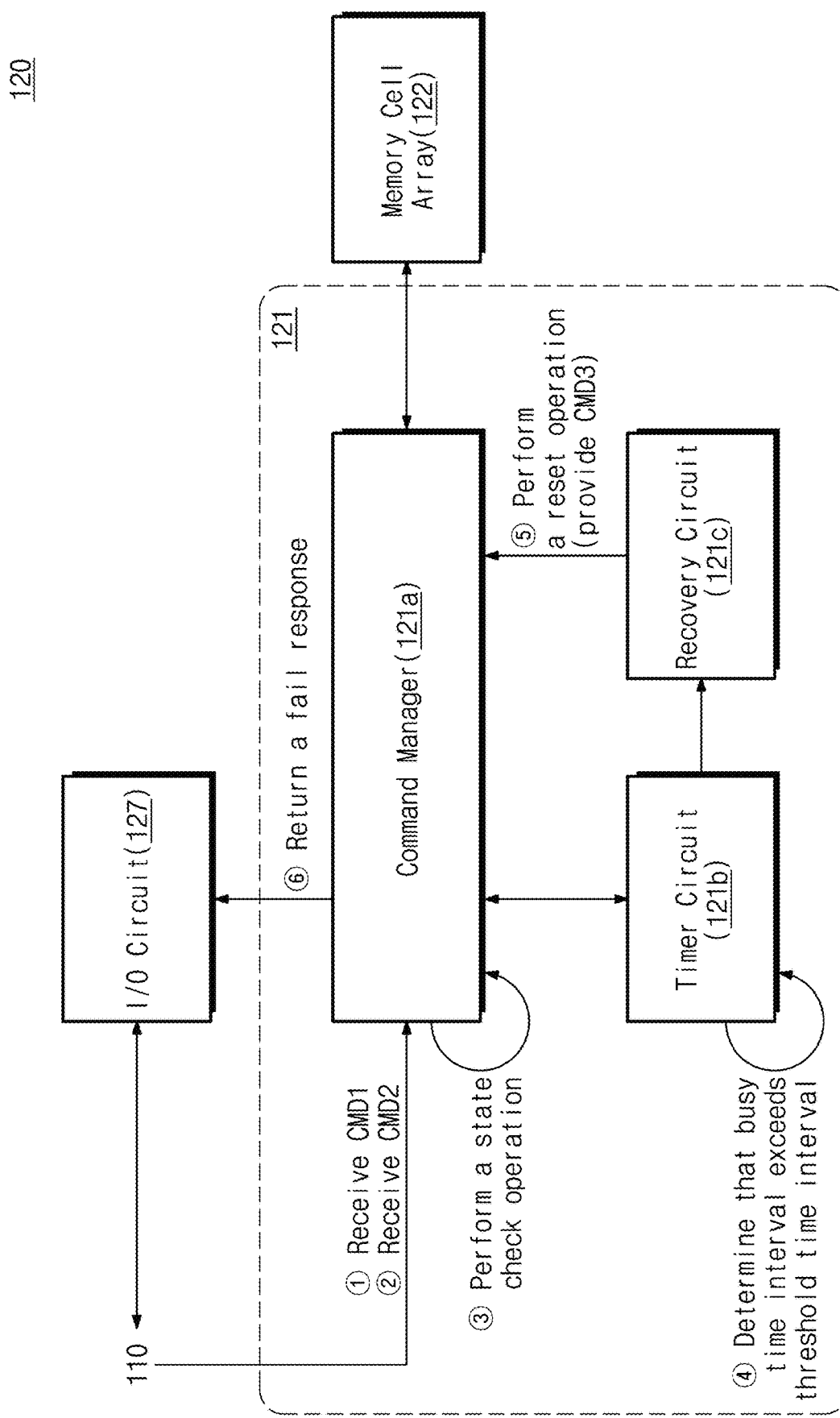
FIG. 7 is a diagram describing a method of operating a non-volatile memory device according to some embodiments of the present disclosure.

FIG. 7 is a diagram describing a method of operating a non-volatile memory device according to some embodiments of the present disclosure. Referring to FIG. 7, the non-volatile memory device 120 may communicate with the storage controller 110. The non-volatile memory device 120 may include the control logic circuit 121, the memory cell array 122, and the I/O circuit 127. The control logic circuit 121 may include the command manager 121*a*, the timer circuit 121*b*, and the recovery circuit 121*c*.

Below, a method of operating the non-volatile memory device 120 will be described.

In a first operation ①, the command manager 121*a* may receive the first data CMD1 from the storage controller 110. The first command CMD1 may indicate the memory operation such as a write operation, a read operation, or a delete operation.

In a second operation ②, the command manager 121*a* may receive the second data CMD2 from the storage controller 110. The second command CMD2 may indicate the state check operation. The state check operation may be an operation for checking whether the processing of the memory operation corresponding to the first command CMD1 succeeds or fails.

In a third operation ③, the command manager 121*a* may perform the state check operation based on the second command CMD2. The command manager 121*a* may determine whether the non-volatile memory device 120 operates in the busy state or operates in the ready state, by performing the state check operation. In some embodiments, the command manager 121*a* may determine that the non-volatile memory device 120 operates in the busy state. The command manager 121a may notify the timer circuit 121b that the non-volatile memory device 120 operates in the busy state.

In a fourth operation ④, the timer circuit 121b may communicate with the command manager 121a and may determine whether a busy time interval exceeds a threshold time interval, in response to determining by the command manager 121a that the non-volatile memory device 120 is in the busy state. The busy time interval may indicate a time interval during which the busy state is continuously maintained. In some embodiments, the timer circuit 121b may determine that the busy time interval exceeds the threshold time interval. The timer circuit 121b may notify the recovery circuit 121c that the busy time interval exceeds the threshold time interval. For example, the timer circuit 121b may provide a trigger signal to the recovery circuit 121c in response to determining that the busy time interval exceeds the threshold time interval.

In a fifth operation ⑤, the recovery circuit 121c may perform the reset operation based on the communication with the timer circuit 121b. For example, the recovery circuit 121c may provide a third command CMD3 for the reset operation to the command manager 121a, based on the trigger signal received from the timer circuit 121b. The command manager 121a may perform the reset operation based on the third command CMD3. After the reset operation is completed, the non-volatile memory device 120 may operate in the ready state.

In a sixth operation ⑥, the command manager 121a may provide the fail response to the storage controller 110 through the I/O circuit 127. The fail response may be provided from the I/O circuit 127 to the storage controller 110 in the form of data. The storage controller 110 may determine a subsequent operation based on the fail response and may provide a command for the subsequent operation to the command manager 121a.

FIG. 8 is a diagram describing responses of a status check operation according to some embodiments of the present disclosure. Referring to FIGS. 7 and 8, the command manager 121a may receive the first command CMD1 for the memory operation and the second command CMD2 for the state check operation. The state check operation corresponding to the second command CMD2 may be an operation for checking whether the processing of the memory operation corresponding to the first command CMD1 succeeds. The command manager 121a may process the second command CMD2 and may generate a response corresponding to the second command CMD2 thus processed. Examples of the response will be described with reference to a table.

Referring to the table, an index of a row direction indicates a return value The return value of the response corresponding to the state check operation may be the pass response or the fail response. The pass response may indicate that the memory operation corresponding to the first command CMD1 succeeds. The fail response may indicate that the memory operation corresponding to the first command CMD1 has failed.

An index of a column direction indicates a state of the non-volatile memory device 120. The non-volatile memory device 120 may operate in the ready state or the busy state. The ready state may indicate that the memory operation corresponding to the first command CMD1 is available. The busy state may indicate that the memory operation corresponding to the first command CMD1 is unavailable.

When the non-volatile memory device 120 operates in the ready state, the command manager 121a may perform the memory operation corresponding to the first command CMD1. When the performed memory operation succeeds, the command manager 121a may generate the pass response. When the performed memory operation fails, the command manager 121a may generate the fail response.

For example, even though the non-volatile memory device 120 operates in the ready state, the non-volatile memory device 120 may fail in the memory operation due to various factors such as device deterioration, a limited resource, and/or an input of another command with higher priority. In some examples, the fail response may include information about a factor causing the failure of the memory operation.

When the non-volatile memory device 120 operates in the busy state, the command manager 121a may fails to attempt the memory operation corresponding to the first command CMD1. In this case, when the command manager 121a does not perform the first command CMD1, the command manager 121a may fail to generate the pass response indicating that the memory operation is successfully performed. After the command manager 121a performs the reset operation to escape the busy hang, the command manager 121a may generate the fail response indicating that the memory operation has failed. In some examples, the fail response may include information describing that the memory operation failed due to the busy hang.

Figure 9:
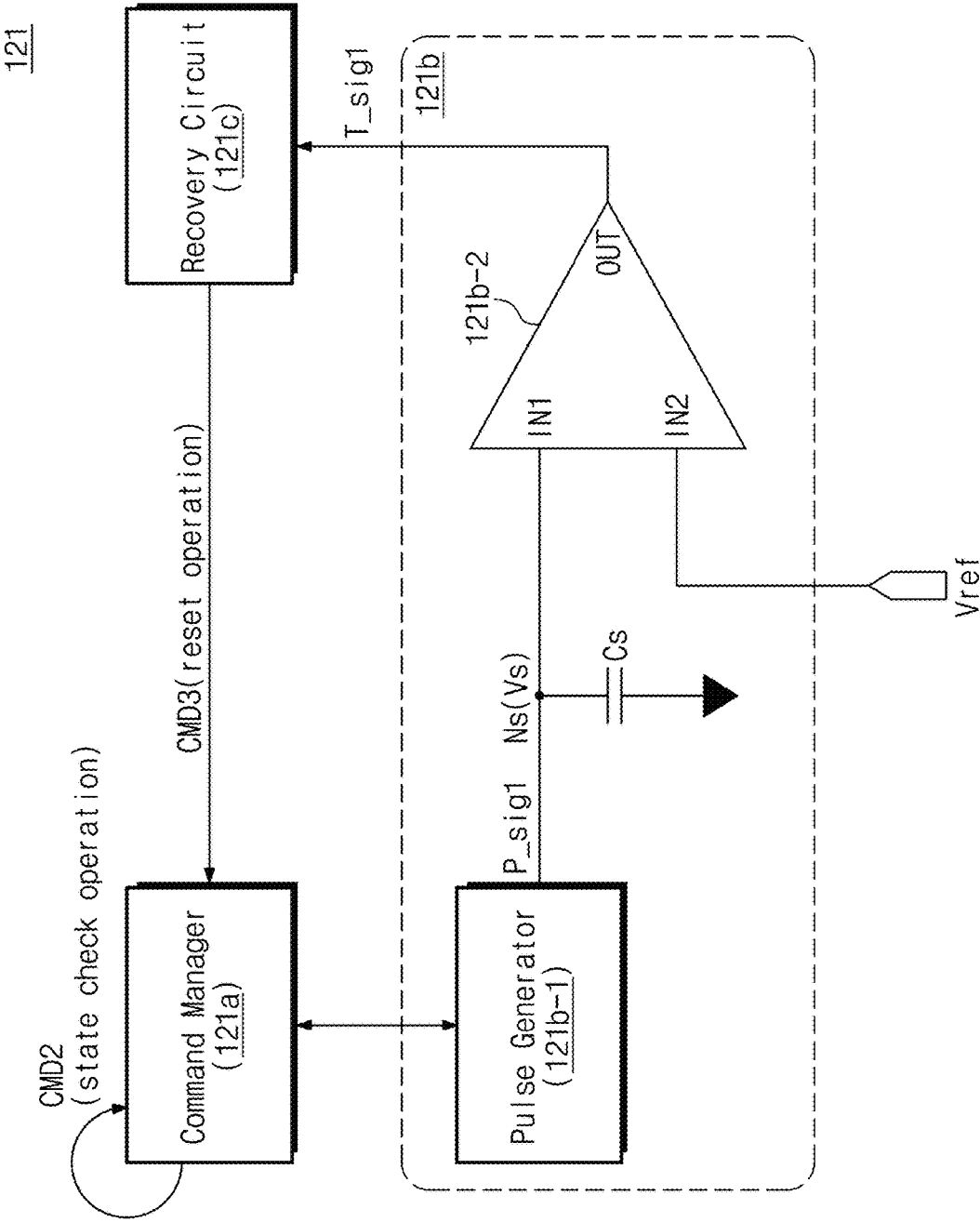
FIG. 9 is a diagram describing an example of a control logic circuit according to some embodiments of the present disclosure.

FIG. 9 is a diagram describing an example of a control logic circuit according to some embodiments of the present disclosure. Referring to FIG. 9, the control logic circuit 121 may correspond to the control logic circuit 121 of FIGS. 1, 6, and 7. The control logic circuit 121 may include the command manager 121a, the timer circuit 121b, and the recovery circuit 121c. The timer circuit 121b may include a pulse generator 121b-1, a sensing capacitor Cs, and a comparator 121b-2.

The command manager 121a may execute the second command CMD2 for the state check operation. The command manager 121a may communicate with the pulse generator 121b-1. The pulse generator 121b-1 may communicate with the command manager 121a and may output a first pulse signal P_sig1 to a sensing node Ns in response to the first busy state among a series of busy states corresponding to the busy time interval.

For example, in response to determining that a state of the non-volatile memory device 120 of FIG. 7 switches from the ready state to the busy state, the command manager 121a may control the pulse generator 121b-1 to generate the first pulse signal P_sig1. Even though the busy state is continuously maintained after the first busy state, the pulse generator 121b-1 may not additionally generate the first pulse signal P_sig1.

The sensing capacitor Cs may be connected between the sensing node Ns and a ground node. The sensing capacitor Cs may have a sensing voltage level Vs. The sensing capacitor Cs may be charged based on the first pulse signal P_sig1 and may be discharged over time.

The comparator 121b-2 may include a first input terminal IN1, a second input terminal IN2, and an output terminal OUT. The first input terminal IN1 may be connected to the sensing node Ns and may receive the sensing voltage level Vs. The second input terminal IN2 may receive a reference voltage level Vref. The reference voltage level Vref may be generated by the voltage generator 123 of FIG. 6. The reference voltage level Vref may correspond to the threshold time interval. The comparator 121b-2 may compare the sensing voltage level Vs and the reference voltage level Vref and may generate a first trigger signal T_sig1 when the sensing voltage level Vs is lower than the reference voltage level Vref.

The recovery circuit 121c may receive the first trigger signal T_sig1 from the comparator 121b-2. The recovery circuit 121c may generate the third command CMD3 for the reset operation, based on the first trigger signal T_sig1. The recovery circuit 121c may provide the third command CMD3 to the command manager 121a. The command manager 121a may perform the reset operation based on the third command CMD3.

In some embodiments, the command manager 121a may deactivate the recovery circuit 121c during the ready state. For example, to prevent an unnecessary reset operation when the busy hang does not occur, the command manager 121a may deactivate the recovery circuit 121c during the ready state. Afterwards, when the transition from the ready state to the busy state is made, the command manager 121a may activate the recovery circuit 121c.

Figure 10:
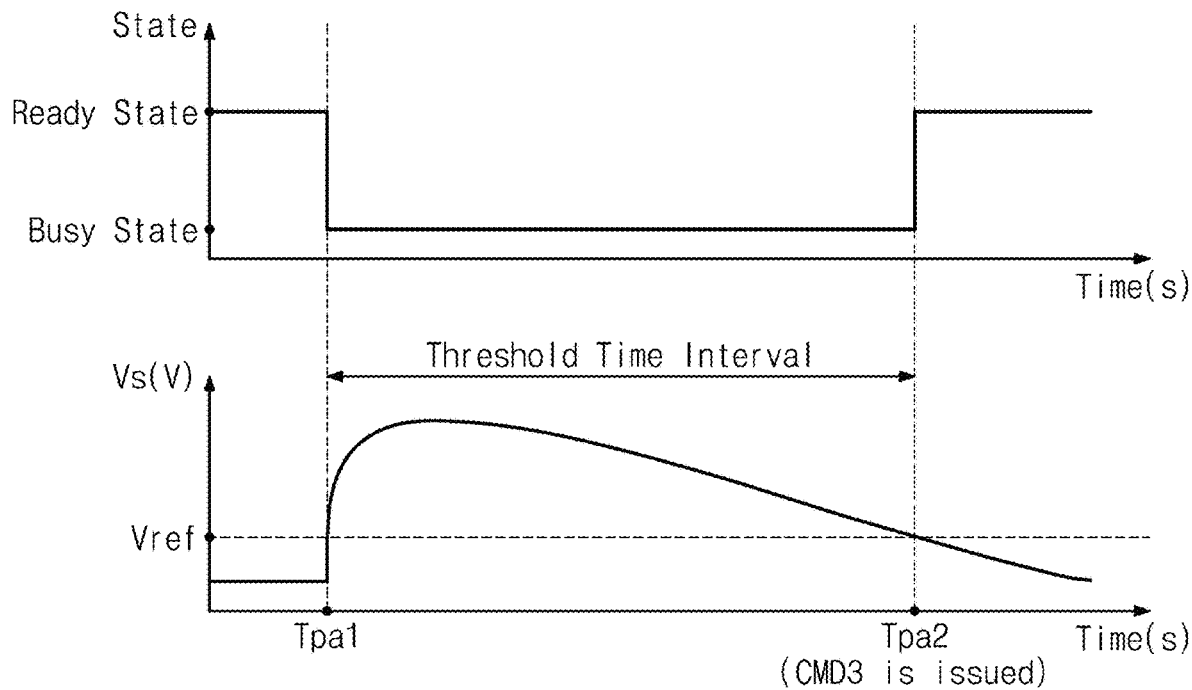
FIG. 10 is a graph describing a state of a non-volatile memory device of FIG. 9, according to some embodiments of the present disclosure.

FIG. 10 is a graph describing a state of a non-volatile memory device of FIG. 9, according to some embodiments of the present disclosure. Referring to FIGS. 9 and 10, the command manager 121a may perform the state check operation of the non-volatile memory device 120 of FIG. 7. The sensing voltage level Vs of the sensing capacitor Cs may be charged based on the first pulse signal P_sig1 and may be discharged over time.

Referring to the top graph indicating a state, the horizontal axis represents time, and the vertical axis represents a state determined by the state check operation. At a first point in time Tpa1, a state of the non-volatile memory device 120 of FIG. 7 may switch from the ready state to the busy state. The command manager 121a may provide the first pulse signal P_sig1 to the sensing capacitor Cs by controlling the pulse generator 121b-1 in response to the transition to the busy state.

Referring to the graph indicating the sensing voltage level Vs, the horizontal axis represents time, and the vertical axis represents a voltage level. At the first point in time Tpa1, the sensing voltage level Vs may increase based on the first pulse signal P_sig1. Afterwards, the sensing capacitor Cs may be discharged over time.

At a second point in time Tpa2, the sensing voltage level Vs may be lower than the reference voltage level Vref. The comparator 121b-2 may generate the first trigger signal T_sig1 in response to determining that the sensing voltage level Vs is lower than the reference voltage level Vref. As the third command CMD3 for the reset operation is issued based on the first trigger signal T_sig1 and the reset operation is performed, the state of the non-volatile memory device 120 of FIG. 7 may be recovered to the ready state.

A time interval from Tpa1 to Tpa2 may be referred to as a "threshold time interval". The reference voltage level Vref may be determined in consideration of a discharging speed of the sensing capacitor Cs and a length of the threshold time interval.

Figure 11:
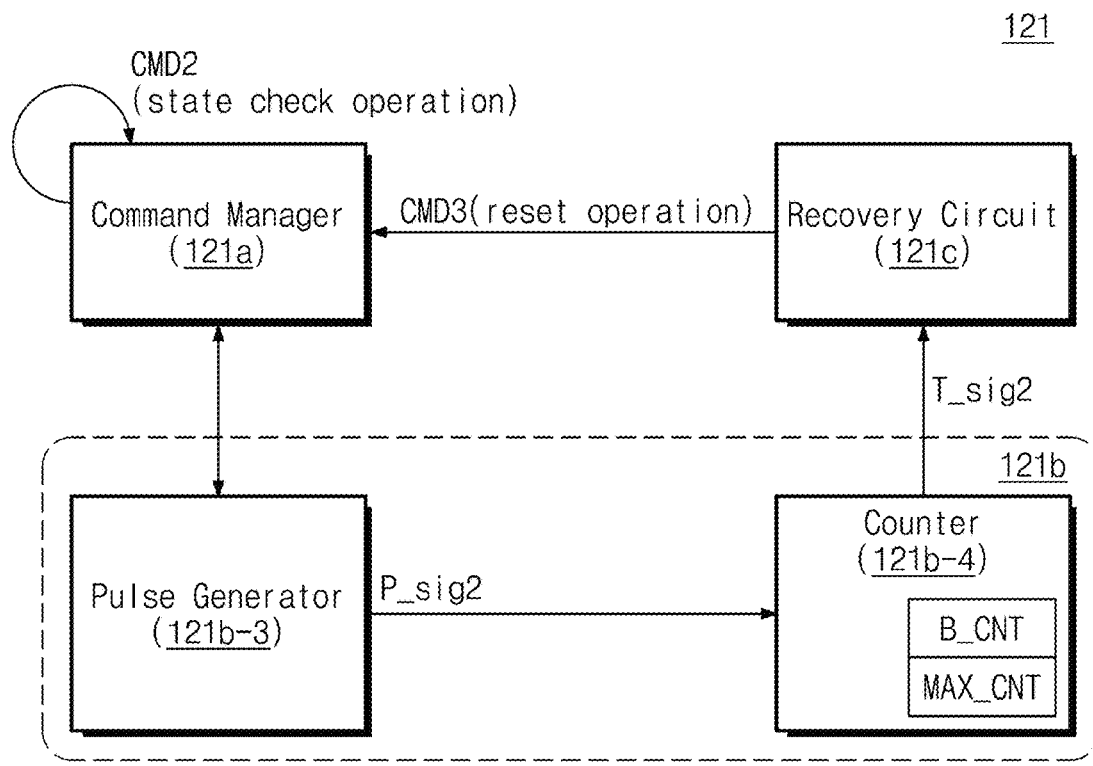
FIG. 11 is a diagram describing an example of a control logic circuit according to some embodiments of the present disclosure.

FIG. 11 is a diagram describing an example of a control logic circuit according to some embodiments of the present disclosure. Referring to FIG. 11, the control logic circuit 121 may correspond to the control logic circuit 121 of FIGS. 1, 6, and 7. The control logic circuit 121 may include the command manager 121a, the timer circuit 121b, and the recovery circuit 121c. The timer circuit 121b may include a pulse generator 121b-3 and a counter 121b-4.

The command manager 121a may execute the second command CMD2 for the state check operation. The command manager 121a may communicate with the pulse generator 121b-3. The pulse generator 121b-3 may communicate with the command manager 121a and may generate a second pulse signal P_sig2 in response to determining by the command manager 121a that the non-volatile memory device 120 is in the busy state. The pulse generator 121b-3 may provide the second pulse signal P_sig2 to the counter 121b-4.

For example, in response to determining that a state of the non-volatile memory device 120 is the busy state by the state check operation, the command manager 121a may control the pulse generator 121b-3 to generate the second pulse signal P_sig2. The second pulse signal P_sig2 may be generated every loop of the state check operation (e.g., the loop includes operation S130, operation S140, and operation S141 of FIG. 3). Unlike the first pulse signal P_sig1 of FIG. 9, the pulse generator 121b-3 may additionally generate the second pulse signal P_sig2 when the busy state is continuously maintained.

The counter 121b-4 may receive the second pulse signal P_sig2 from the pulse generator 121b-3. The counter 121b-4 may manage a busy count value B_CNT based on the second pulse signal P_sig2. The busy count value B_CNT may indicate the number of second pulse signals P_sig2 received after the transition from the ready state to the busy state is made. An initial value of the busy count value B_CNT may be "0". After the transition from the ready state to the busy state is made, the counter 121b-4 may increase the busy count value B_CNT as much as a unit magnitude value (e.g., "1"), based on the second pulse signal P_sig2.

The counter 121b-4 may compare the increased busy count value B_CNT with a maximum count value MAX_CNT. The maximum count value MAX_CNT may correspond to the threshold time interval. When the increased busy count value B_CNT exceeds the maximum count value MAX_CNT, the counter 121b-4 may generate a second trigger signal T_sig2. The counter 121c-4 may provide the second trigger signal T_sig2 to the recovery circuit 121c. The counter 121b-4 may generate the second trigger signal T_sig2 and may then set the busy count value B_CNT to the initial value.

The recovery circuit 121c may receive the second trigger signal T_sig2 from the counter 121b-4. The recovery circuit 121c may generate the third command CMD3 for the reset operation, based on the second trigger signal T_sig2. The recovery circuit 121c may provide the third command CMD3 to the command manager 121a. The command manager 121a may perform the reset operation based on the third command CMD3.

FIG. 12 is a graph describing a state of a non-volatile memory device of FIG. 11, according to some embodiments of the present disclosure. Referring to FIGS. 11 and 12, the command manager 121a may perform the state check operation of the non-volatile memory device 120 of FIG. 7. The pulse generator 121b-3 may generate the second pulse signal P_sig2 based on the communication with the command manager 121a. The counter 121b-4 may manage the busy count value B_CNT based on the second pulse signal P_sig2.

Referring to the top graph indicating a state, the horizontal axis represents time, and the vertical axis represents a state determined by the state check operation. At a first point in time Tpb1, a state of the non-volatile memory device 120 of FIG. 7 may switch from the ready state to the busy state.

Referring to the center graph indicating the second pulse signal P_sig2, the horizontal axis represents time, and the vertical axis represents a pulse signal. At a first point in time Tpb1, in response to determining that a state of the non-volatile memory device 120 is the busy state by the state check operation, the command manager 121*a* may control the pulse generator 121*b*-3 to generate the second pulse signal P_sig2, e.g., with a logic high value. Afterwards, while the busy state is continuously maintained, every loop of the state check operation, the command manager 121*a* may control the pulse generator 121*b*-3 to generate the second pulse signal P_sig2.

Referring to the bottom graph indicating the busy count value B_CNT, the horizontal axis represents time, and the vertical axis represents a count value. Before the first point in time Tpb1, the busy count value B_CNT may have an initial value of "0". At the first point in time Tpb1, the counter 121*b*-4 may increase the busy count value B_CNT based on the second pulse signal P_sig2. Afterwards, while the busy state is continuously maintained, the counter 121*b*-4 may increase the busy count value B_CNT based on the sequentially received second pulse signals P_sig2.

At a second point in time Tpb2, the increased busy count value B_CNT may exceed the maximum count value MAX_CNT. The counter 121*b*-4 may generate the second trigger signal T_sig2 in response to determining that the increased busy count value B_CNT exceeds the maximum count value MAX_CNT. As the third command CMD3 for the reset operation is issued based on the second trigger signal T_sig2 and the reset operation is performed, the state of the non-volatile memory device 120 of FIG. 7 may be recovered to the ready state.

A time interval from Tpb1 to Tpb2 may be referred to as a "threshold time interval". The maximum count value MAX_CNT may be determined in consideration of a time taken to perform the loop of the state check operation and a length of the threshold time interval.

According to an embodiment of the present disclosure, a non-volatile memory device performing a reset operation, a storage device including the same, and a method of operating the same are provided.

Also, a non-volatile memory device which guarantees a consistent response time without the burden of firmware by detecting a busy hang through an on-chip operation without the intervention of a storage controller and performing a reset operation by using a recovery circuit, a storage device including the same, and a method of operating the same are provided.

While the present disclosure has been described with reference to embodiments thereof, it will be apparent to those of ordinary skill in the art that various changes and modifications may be made thereto without departing from the scope of the present disclosure as set forth in the following claims.

What is claimed is:

1. A method of operating a non-volatile memory device, the method comprising:
  receiving, at a control logic circuit of the non-volatile memory device, a first command signal for a state check operation from a storage controller;
  determining, by the control logic circuit, whether the non-volatile memory device is in a busy state, based on the first command signal;
  determining, by the control logic circuit, whether a busy time interval during which the busy state is continuously maintained exceeds a threshold time interval, in response to determining that the non-volatile memory device is in the busy state;
  performing, by the control logic circuit, a reset operation of the non-volatile memory device, in response to determining that the busy time interval exceeds the threshold time interval; and
  providing, from the control logic circuit, a fail response signal to the storage controller, in response to determining that the busy time interval exceeds the threshold time interval.

2. The method of claim 1, wherein the control logic circuit comprises a timer circuit and a recovery circuit, the method further comprising:
  generating, by the timer circuit, a trigger signal in response to determining that the busy time interval exceeds the threshold time interval; and
  generating, by the recovery circuit, a second command signal for the reset operation based on the trigger signal.

3. The method of claim 1, further comprising:
  receiving, at the control logic circuit, a third command signal for a memory operation from the storage controller, before receiving the first command signal.

4. The method of claim 3, further comprising:
  indicating, in the busy state, that the memory operation is unavailable; or
  indicating, in a ready state, that the memory operation is available.

5. The method of claim 3, further comprising:
  performing, by the control logic circuit, the memory operation, in response to determining that the non-volatile memory device is not in the busy state.

6. The method of claim 5, further comprising:
  determining, by the control logic circuit, whether the memory operation has failed; and
  providing, from the control logic circuit, the fail response signal to the storage controller, in response to determining that the memory operation has failed.

7. The method of claim 5, further comprising:
  determining, by the control logic circuit, whether the memory operation has failed; and
  providing, from the control logic circuit, a pass response signal to the storage controller, in response to determining that the memory operation has not failed.

8. The method of claim 1, further comprising:
  performing, by the control logic circuit, a subsequent state check operation, in response to determining that the busy time interval does not exceed the threshold time interval;
  determining, by the control logic circuit, whether the non-volatile memory device is in the busy state, at a subsequent point in time after performing the subsequent state check operation; and
  determining, by the control logic circuit, whether a subsequent busy time interval during which the busy state is continuously maintained corresponding to the subsequent point in time exceeds the threshold time interval, in response to determining, at the subsequent point in time, that the non-volatile memory device is in the busy state.

9. The method of claim 1, wherein the non-volatile memory device comprises a sensing capacitor, and
  wherein the determining whether the busy time interval during which the busy state is continuously maintained exceeds the threshold time interval comprises:
    when a sensing voltage level of the sensing capacitor is lower than a reference voltage level, determining that the busy time interval exceeds the threshold time interval, wherein the sensing capacitor is charged based on a first busy state among a series of busy states corresponding to the busy time interval and is discharged over time.

10. The method of claim 9, wherein the control logic circuit further comprises a pulse generator, a comparator, and a recovery circuit, the method further comprising:
providing, by the pulse generator, a pulse signal to the sensing capacitor based on the first busy state among the series of busy states;
comparing, by the comparator, the sensing voltage level of the sensing capacitor and the reference voltage level;
generating, by the comparator, a trigger signal when the sensing voltage level of the sensing capacitor is lower than the reference voltage level; and
generating, by the recovery circuit, a second command signal for the reset operation in response to the trigger signal.

11. The method of claim 1, wherein the determining whether the busy time interval during which the busy state is continuously maintained exceeds the threshold time interval comprises:
increasing a busy count value, in response to determining that the non-volatile memory device is in the busy state; and
when the increased busy count value exceeds a maximum count value, determining that the busy time interval exceeds the threshold time interval.

12. The method of claim 11, wherein the control logic circuit further comprises a pulse generator, a counter, and a recovery circuit, the method further comprising:
generating, by the pulse generator, a pulse signal in response to determining that the non-volatile memory device is in the busy state;
increasing, by the counter, the busy count value based on the pulse signal;
comparing, by the counter, the increased busy count value and the maximum count value;
generating, by the counter, a trigger signal when the increased busy count value exceeds the maximum count value; and
generating, by the recover circuit, a second command signal for the reset operation in response to the trigger signal.

13. A non-volatile memory device comprising:
a control logic circuit configured to receive a first command signal for a memory operation and a second command signal for a state check operation from a storage controller; and
a memory cell array,
wherein the control logic circuit is configured to:
determine whether the non-volatile memory device is in a busy state, based on the second command signal;
determine whether a busy time interval during which the busy state is continuously maintained exceeds a threshold time interval, in response to determining that the non-volatile memory device is in the busy state;
perform a reset operation of the non-volatile memory device, in response to determining that the busy time interval exceeds the threshold time interval; and
provide a fail response signal to the storage controller, in response to determining that the busy time interval exceeds the threshold time interval.

14. The non-volatile memory device of claim 13, wherein the control logic circuit comprises:
a command manager configured to receive the first command signal, to receive the second command signal, and to determine whether the non-volatile memory device is in the busy state or a ready state, based on the second command signal;
a timer circuit configured to determine whether the busy time interval exceeds the threshold time interval when it is determined by the command manager that the non-volatile memory device is in the busy state, and to generate a trigger signal when it is determined that the busy time interval exceeds the threshold time interval; and
a recovery circuit configured to provide a third command signal for the reset operation to the command manager based on the trigger signal.

15. The non-volatile memory device of claim 14, wherein the command manager is further configured to:
when it is determined that the non-volatile memory device is in the ready state, perform the memory operation in the memory cell array based on the first command signal;
determine whether the memory operation has failed;
provide the fail response signal to the storage controller, in response to determining that the memory operation has failed; and
provide a pass response signal to the storage controller, in response to determining that the memory operation has not failed.

16. The non-volatile memory device of claim 14, wherein the timer circuit comprises:
a sensing capacitor;
a pulse generator configured to communicate with the command manager and to provide a pulse signal to the sensing capacitor based on a first busy state among a series of busy states corresponding to the busy time interval; and
a comparator configured to compare a sensing voltage level of the sensing capacitor and a reference voltage level and to generate the trigger signal when the sensing voltage level of the sensing capacitor is lower than the reference voltage level.

17. The non-volatile memory device of claim 14, wherein the timer circuit comprises:
a pulse generator configured to communicate with the command manager and to generate a pulse signal when it is determined by the command manager that the non-volatile memory device is in the busy state; and
a counter configured to increase a busy count value based the pulse signal, to compare the busy count value and a maximum count value, and to generate the trigger signal when the busy count value exceeds the maximum count value.

18. A storage device comprising:
a storage controller configured to generate a first command signal for a state check operation; and
a non-volatile memory device,
wherein the non-volatile memory device is configured to:
receive the first command signal from the storage controller;
determine whether the non-volatile memory device is in a busy state, based on the first command signal;
determine whether a busy time interval during which the busy state is continuously maintained exceeds a threshold time interval, in response to determining that the non-volatile memory device is in the busy state;
perform a reset operation of the non-volatile memory device, in response to determining that the busy time interval exceeds the threshold time interval; and provide a fail response signal to the storage controller, in response to determining that the busy time interval exceeds the threshold time interval.

19. The storage device of claim 18, wherein the non-volatile memory device comprises:
a command manager configured to receive the first command signal and to determine whether the non-volatile memory device is in the busy state or a ready state, based on the first command signal;
a timer circuit configured to determine whether the busy time interval exceeds the threshold time interval when it is determined by the command manager that the non-volatile memory device is in the busy state, and to generate a trigger signal when it is determined that the busy time interval exceeds the threshold time interval; and
a recovery circuit configured to provide a second command signal for the reset operation to the command manager based on the trigger signal.

20. The storage device of claim 19, wherein the storage controller is further configured to:
generate a third command signal for a memory operation before generating the first command signal, and
wherein the command manager is further configured to:
when it is determined that the non-volatile memory device is in the ready state, perform the memory operation based on the third command signal;
determine whether the memory operation has failed;
returning the fail response signal to the storage controller, in response to determining that the memory operation has failed; and
return a pass response signal to the storage controller, in response to determining that the memory operation has not failed.

* * * * *